US010185116B2

(12) United States Patent
Yamamoto

(10) Patent No.: US 10,185,116 B2
(45) Date of Patent: Jan. 22, 2019

(54) LENS DRIVING APPARATUS AND LENS DRIVING METHOD

(71) Applicant: CANON KABUSHIKI KAISHA, Tokyo (JP)

(72) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/993,610

(22) Filed: Jan. 12, 2016

(65) Prior Publication Data

US 2016/0202445 A1 Jul. 14, 2016

(30) Foreign Application Priority Data

Jan. 14, 2015 (JP) .................................. 2015-004693

(51) Int. Cl.
*G02B 7/04* (2006.01)
*G02B 7/09* (2006.01)
(Continued)

(52) U.S. Cl.
CPC .............. *G02B 7/04* (2013.01); *G02B 7/02* (2013.01); *G02B 7/08* (2013.01); *G02B 7/09* (2013.01); *G02B 7/102* (2013.01); *G02B 27/646* (2013.01)

(58) Field of Classification Search
CPC . G02B 7/02; G02B 7/023; G02B 7/04; G02B 7/08; G02B 7/09; G02B 7/10; G02B 7/102; G02B 7/105
(Continued)

(56) References Cited

U.S. PATENT DOCUMENTS 5,146,071 A * 9/1992 Ookubo ................. G02B 7/102
250/201.2
5,225,941 A * 7/1993 Saito ........................ B23Q 1/34
310/311
(Continued)

FOREIGN PATENT DOCUMENTS

JP 04-005607 A 1/1992
JP 2007-053840 A 3/2007
(Continued)

OTHER PUBLICATIONS

Oct. 2, 2018 Japanese Office Action that issued in Japanese Patent Application No. 2015-004693.

*Primary Examiner* — Nicholas R Pasko
(74) *Attorney, Agent, or Firm* — Cowan, Liebowitz & Latman, P.C.

(57) ABSTRACT

A lens driving apparatus includes a lens holding member for holding a lens movably in an optical axis direction; a first guide bar and a second guide bar that support the lens holding member movably in the optical axis direction; first driving unit and second driving unit that drive the lens holding member in the optical direction; and first position detection unit and second position detection unit that are positioned close to the first driving unit and the second driving unit to detect a position in the optical axis direction. Upon driving the lens holding member, either of or both of the first driving unit and the second driving unit are driven and controlled from a position detection result of the first position detection unit and the second position detection unit in such a manner that the first and second driving units are positioned at a predetermined position.

5 Claims, 5 Drawing Sheets

(51) Int. Cl.
 *G02B 7/10* (2006.01)
 *G02B 7/02* (2006.01)
 *G02B 7/08* (2006.01)
 *G02B 27/64* (2006.01)

(58) Field of Classification Search
 USPC .................................. 359/694–706, 822–826
 See application file for complete search history.

(56) References Cited

U.S. PATENT DOCUMENTS

| | | | | |
|---|---|---|---|---|
| 5,455,811 | A * | 10/1995 | Tanaka | G11B 7/08505 369/44.14 |
| 5,541,777 | A * | 7/1996 | Sakamoto | G02B 7/102 310/13 |
| 6,639,744 | B2 * | 10/2003 | Ohno | G11B 7/0933 359/824 |
| 8,077,412 | B2 * | 12/2011 | Santo | G02B 7/102 359/696 |
| 2007/0091462 | A1 * | 4/2007 | Sasaki | G02B 7/102 359/694 |
| 2007/0115568 | A1 * | 5/2007 | Akiba | G02B 7/08 359/824 |
| 2007/0133970 | A1 * | 6/2007 | Honjo | G02B 7/08 396/97 |
| 2007/0217775 | A1 * | 9/2007 | Shirono | G02B 7/102 396/72 |
| 2010/0085649 | A1 * | 4/2010 | Wischnewskij | G02B 7/023 359/698 |
| 2012/0050577 | A1 * | 3/2012 | Hongu | G02B 7/102 348/240.1 |
| 2012/0087022 | A1 * | 4/2012 | Tanaka | G02B 7/08 359/824 |

FOREIGN PATENT DOCUMENTS

| | | |
|---|---|---|
| JP | 2011-043705 A | 3/2011 |
| JP | 2013044902 A * | 3/2013 |

* cited by examiner

LENS DRIVING APPARATUS AND LENS DRIVING METHOD

BACKGROUND OF THE INVENTION

Field of the Invention

The present invention relates to a lens driving apparatus and a lens driving method to be applied to optical instruments.

Description of the Related Art

There has been known a technique in which two voice coil motors are used to drive a lens in the conventional type of lens driving apparatuses and lens driving methods.

In the above mentioned prior art that is disclosed in Japanese Patent Application Laid-Open No. 2011-043705, VCMs 66 and a magnetic sensor 120 are disposed near a first guide axis 39 as a reference. Specifically, a pair of VCMs 66 are disposed symmetrically with the first guide axis 39 interposed therebetween at a position where they can be closest to the first guide axis 39.

If a weight of a focus lens 36 increases due to requirements of optical design, a focus lens frame 37 that supports it is elastically deformed due to posture change. As a result, there is a risk that inclination of the focus lens 36 is changed with respect to an optical axis to deteriorate optical performance. Further, posture change occurs due to an influence of backlash caused at a fitting portion between the first guide axis 39 and the focus lens frame 37, so that the inclination of the focus lens 36 is changed with respect to the optical axis. Thereby, there is a risk that optical performance is deteriorated due to such posture change in lens drive of the optical instruments. However, the above mentioned configuration of prior art shows no technical solution on this problem.

Furthermore, although it is necessary to drive and control with a good accuracy a heavy lens or a lens strictly required for inclination accuracy, no technical solution has been shown in the configuration of prior art.

SUMMARY OF THE INVENTION

Accordingly, an object of the invention is to provide a lens driving apparatus and a lens driving method that prevent optical performance from deterioration due to posture change in drive of a lens of optical instruments.

To attain the above-mentioned object, a technical feature of the invention is in, upon driving the lens holding member that holds a lens movably in an optical axis direction and that is supported by the first guide bar and the second guide bar, driving and controlling either of or both of the first driving unit and the second driving unit in such a manner that the first driving unit and the second driving unit are positioned at a target position, according to a position detection result of the first position detection unit and the second position detection unit that detect a position of the first driving unit and the second driving unit in the optical axis that drive the lens holding member.

Further, an another technical feature is in, in order to move to a target position the lens holding member that holds a lens movably in an optical axis direction and that is supported by the first guide bar and the second guide bar, after driving the first driving unit and the second driving unit that drive the lens holding member in the optical direction to stop drive of the first driving unit and the second driving unit; and stopping a power supply to one of the first driving unit and the second driving unit, and driving and controlling the other one of the first driving unit and the second driving unit.

Furthermore, an another technical feature is in, upon driving the lens holding member that holds a lens movably in an optical axis direction and that is supported by the first guide bar and the second guide bar, resetting driving control of the second driving unit if a difference between a position of the first driving unit detected by the first position detection unit and a position of the second driving unit detected by the second position detection unit exceeds a predetermined value from a result of a position detection of the first position detection unit and the second position detection unit that detect a position in the optical direction of the first driving unit and the second driving unit that drive the lens holding member.

According to the invention, optical performance can be prevented from deterioration due to posture change of a lens driving apparatus, in the lens driving apparatus used for the optical instruments.

Further features of the present invention will become apparent from the following description of exemplary embodiments with reference to the attached drawings.

DESCRIPTION OF THE EMBODIMENTS

Figure 1:
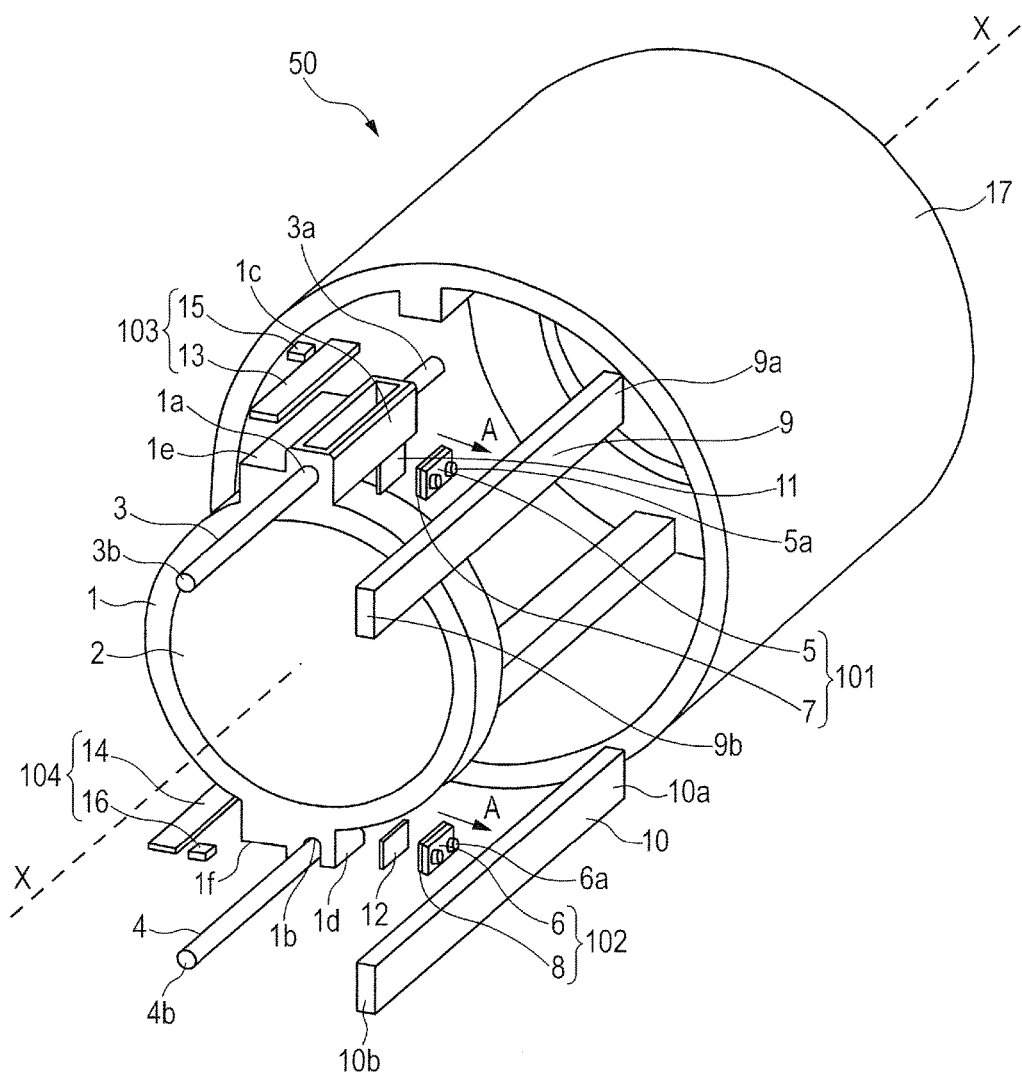
FIG. 1 is a perspective view illustrating a main part of a lens driving apparatus according to an embodiment of the invention.

An embodiment of the present invention will now be described below in detail in accordance with the accompanying drawings. In respective drawings, the same components are denoted by the same reference numerals. Further, it is needless to say that the embodiment to be described below exemplifies the invention and the invention is not limited thereto.

Embodiment

FIG. 1 is a perspective view illustrating a main part of a lens driving apparatus according to an embodiment of the invention. A lens driving apparatus 50 is provided with a lens holding member 1 that holds a lens 2 movable in a direction of an optical axis X (hereinafter referred to as an "optical axis direction") and a first guide bar 3 and a second guide bar 4 that support the lens holding member 1 movable, in the optical axis direction. The first guide bar 3 and the second guide bar 4 are slidably engaged with an engaged hole portion 1a and a U-shaped groove portion 1b serving as a rotation stop, of the lens holding member 1 respectively, to guide the lens holding member 1 along the optical axis X (see FIG. 1).

The lens driving apparatus 50 is provided with first driving unit and second driving unit that drive the lens holding member 1 in the optical direction. Vibration plates 5 and 6 constituting a linear type ultrasonic motor are integratedly adhered to publicly known piezoelectric elements 7 and 8, respectively. A vibrator 101 that is first driving unit is constituted by the piezoelectric element 7 adhered to the vibration plate 5 and a vibrator 102 that is the second driving unit is constituted by the piezoelectric element 8 adhered to the vibration plate 6.

In the linear ultrasonic motor, the first driving unit and the second driving unit are driven at a same driving frequency. Further, driving voltages for driving the first driving unit and the second driving unit are variably controlled on the basis of position detection signals of first position detection unit and second position detection unit to be described below.

When a high frequency voltage is applied, the vibrators 101 and 102 are set to cause resonance in each of a long side direction and a short side direction. As a result, sliding portion tips 5a and 6a formed on the vibration plates 5 and 6 generate elliptical motions. At this occasion, a rotational direction and a ratio of the major axis to the minor axis of the ellipse of elliptical motion are properly changed by changing a frequency and a phase of a voltage applied to the piezoelectric elements 7 and 8 to be capable of generating a desired motion. Accordingly, the sliding portion tips 5a and 6a are in frictional contact with sliders 9 and 10 that are mating members with which the sliding portion tips 5a and 6a are in pressed contact to generate a drive force, enabling the vibrators 101 and 102 to be driven along the optical axis direction.

At this occasion, the vibrators 101 and 102 are fixed to the lens holding member 1 as below. Connection members 11 and 12 that connect the vibrators 101 and 102 with the lens holding member 1 are fixed to fixing portions 1c and 1d of the lens holding member 1, respectively. The connection members 11 and 12 have a function like a leaf spring for bringing the vibrators 101 and 102 in pressedly contact with the sliders 9 and 10 elastically. Thereby, upon assembly, the sliding portion tips 5a and 5b of the vibration plates 5 and 6 can be pressed against the sliders 9 and 10.

With scales 13 and 14 in each of which a magnetic pattern is formed, a position of a measurement target is read by reading sensors 15 and 16, respectively. The scales 13 and 14 are adhesively fixed to mounting portions 1e and 1f of the lens holding member 1 to be movable integrally with the lens holding member 1 in the optical axis direction.

The lens driving apparatus 50 is provided with first position detection unit 103 and second position detection unit 104. The scale 13 and the reading sensor 15 constitute the first position detection unit 103 and the scale 14 and the reading sensor 16 constitute the second position detection unit 104, to detect a position of the lens holding member 1 in the optical axis direction. The reading sensors 15 and 16 are fixed to a lens barrel 17 to be described below by publicly known glue or the like.

Figure 2:
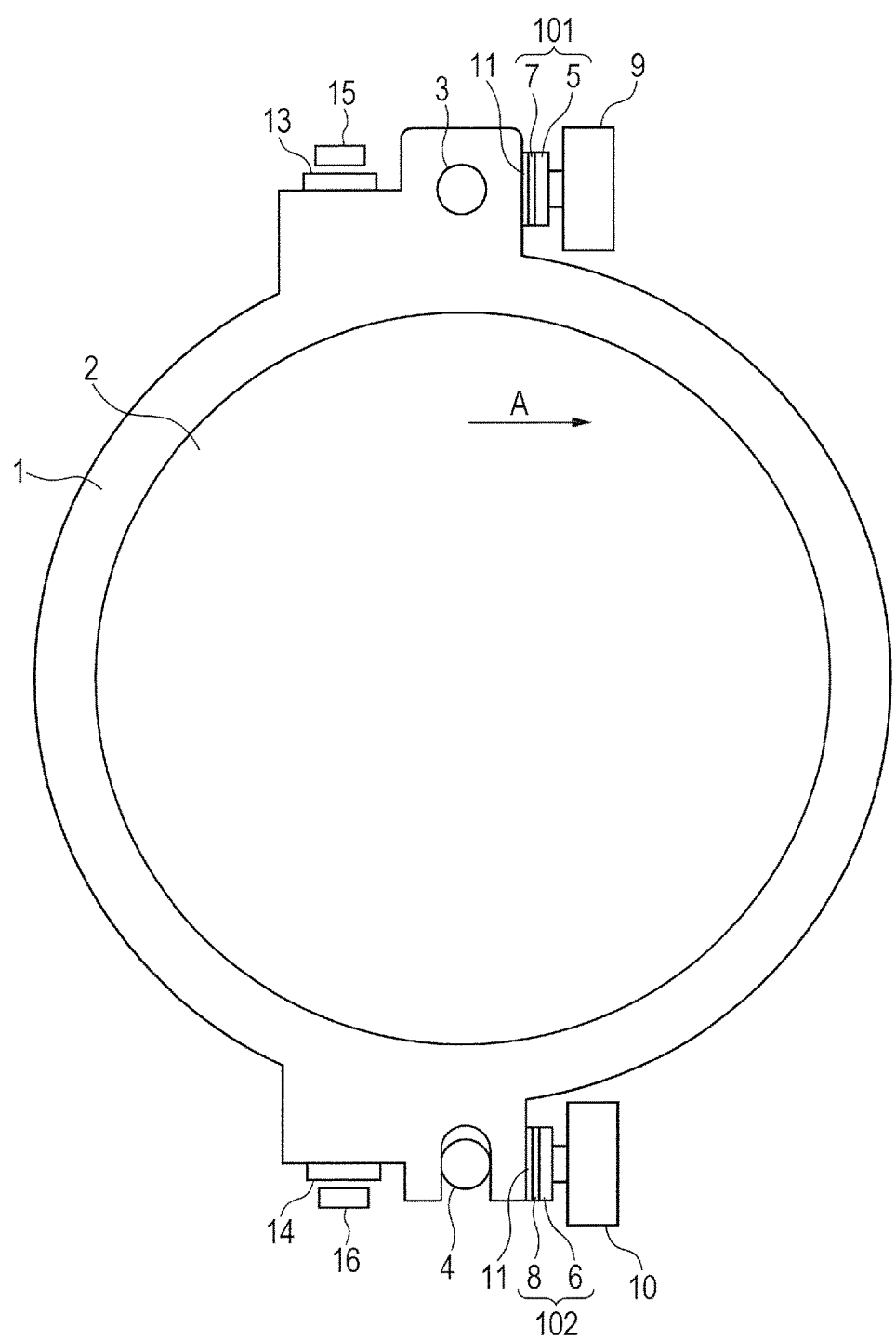
FIG. 2 is a front view illustrating an assembled state of a main part of a lens driving apparatus according to an embodiment of the invention.

As illustrated in FIGS. 1 and 2, the scale 13 and the reading sensor 15 that constitute the first position detection unit are arranged near the vibrator 101 that is the first driving unit. Further, the scale 14 and the reading sensor 16 that constitute the second position detection unit are arranged near the vibrator 102 that is the second driving unit. The second driving unit is arranged at a position symmetrical to the first driving unit with respect to the optical axis X of the lens 2. In this embodiment, the first driving unit and the second driving unit are provided at positions so as to be different in phase from each other by 180 degrees with respect to the lens holding member 1.

One end portion 3a of the first guide bar 3 in an axial direction, one end (not illustrated) of the second guide bar 4, the reading sensors 15 and 16, and further one ends 9a and 10a of the sliders 9 and 10 in an axial direction are fixed to a predetermined (target) position of the lens barrel 17. Further, the other end portion 3b of the first guide bar 3 in the axial direction, the other end portion 4b of the second guide bar 4 in the axial direction, and further the other ends 9b and 10b of the sliders 9 and 10 in the axial direction are held by a lid member (not illustrated). The unillustrated lid member is fixed to the lens barrel 17 by screw so that since the lens holding member 1 is held in a state where both ends thereof are supported, the lens holding member 1 can be held stably.

As explained above, the lens driving apparatus 50 according to the embodiment of the invention is configured. FIG. 2 is a front view illustrating an assembled state of a main part of the lens driving apparatus according to the embodiment of the invention.

In the assembled state, the vibrators 101 and 102 are pressed in a direction (shown by an arrow A in FIGS. 1 and 2) toward the sliders 9 and 10 by pressing forces of the connection members 11 and 12, respectively. As a result, the sliding portion tips 5a and 6a are brought in frictional contact with the sliders 9 and 10, so that ultrasonic vibration of the vibrators 101 and 102 that are the first driving unit and the second driving unit enables the lens holding member 1 to move backward in the optical axis X, as described above.

Figure 3:
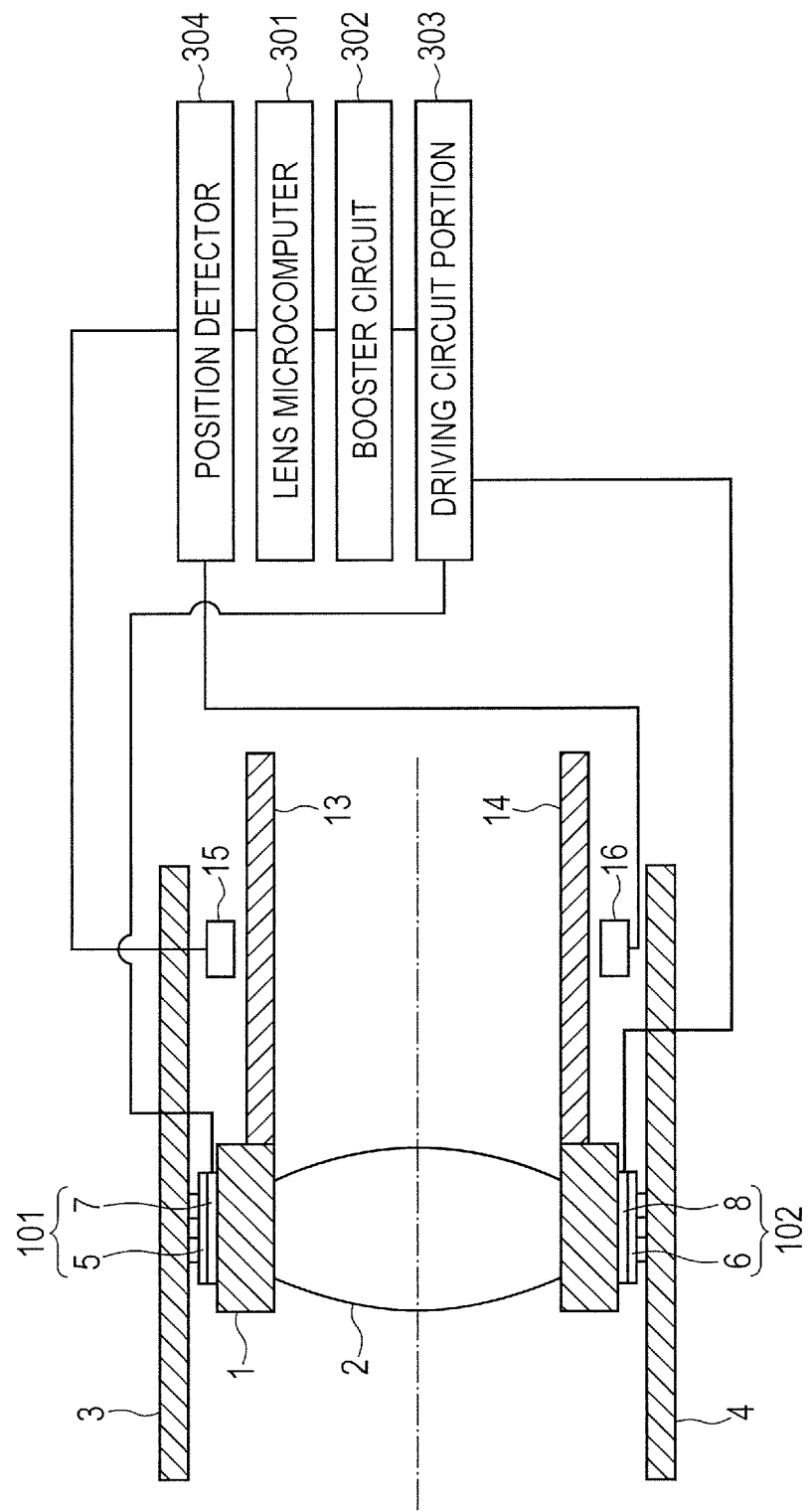
FIG. 3 is a configuration diagram of a driving circuit of a lens driving apparatus to which the invention is applied.

Subsequently, driving control of the lens driving apparatus 50 configured as described above will be explained. FIG. 3 is a configuration diagram of a driving circuit of the lens driving apparatus to which the invention is applied. A relation between an inside configuration (cross section) of the lens driving apparatus and a configuration of the driving circuit is illustrated. A lens microcomputer 301 manages and executes control as to lens drive to be described below. A booster circuit 302 is connected with the lens microcomputer 301 to generate a high voltage so as to apply a high frequency voltage to the piezoelectric elements 7 and 8.

The driving circuit. 303 is connected with the booster circuit 302 and the piezoelectric elements 7 and 8, and changes a voltage and a frequency of the high voltage generated by the booster circuit 302 to perform supply to the piezoelectric elements 7 and 8. Further, a position detector 304 is connected with the lens microcomputer 301 and the reading sensors 15 and 16 to detect positional information from the reading sensors 15 and 16.

A driving control method upon performing focusing operation of the lens 2 practically in the above mentioned configuration of the driving circuit will be explained below. Here a driving voltage for driving the first driving unit and the second driving unit is variably controlled on the basis of the position detection signals of the first position detection unit and the second position detection unit.

Figure 4:
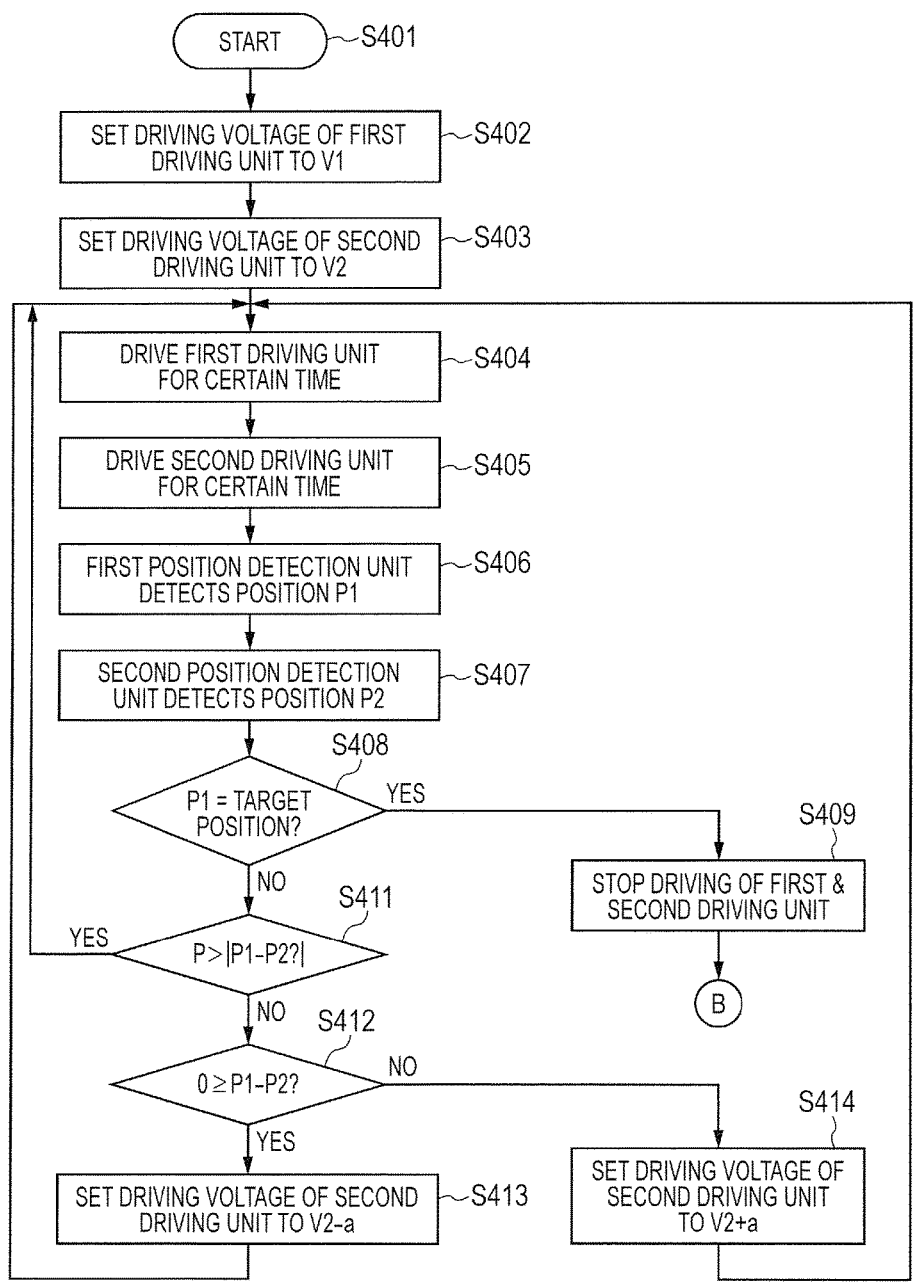
FIG. 4 is a flowchart upon driving a lens holding member that holds a lens.

FIG. 4 is a flowchart upon moving the lens holding member 1 that holds the lens 2 from a start position toward a target position. Each step will be described below according to FIG. 4. In step S401 driving control is initiated. In step S402 a driving voltage to be supplied to the first driving unit is set to V1, and in step S403 a driving voltage to be supplied to the second driving unit is set to V2.

In step S404 the first driving unit is driven for a certain time, and in step S405 the second driving unit is driven for a certain time. Next, in step S406 a position of the first driving unit is detected as a position P1 by the first position detection unit. In step S407, a position of the second driving unit is detected as a position P2. In step S408 a determination is made as to whether or not the position P1 of the first driving unit is at the target position.

Figure 5:
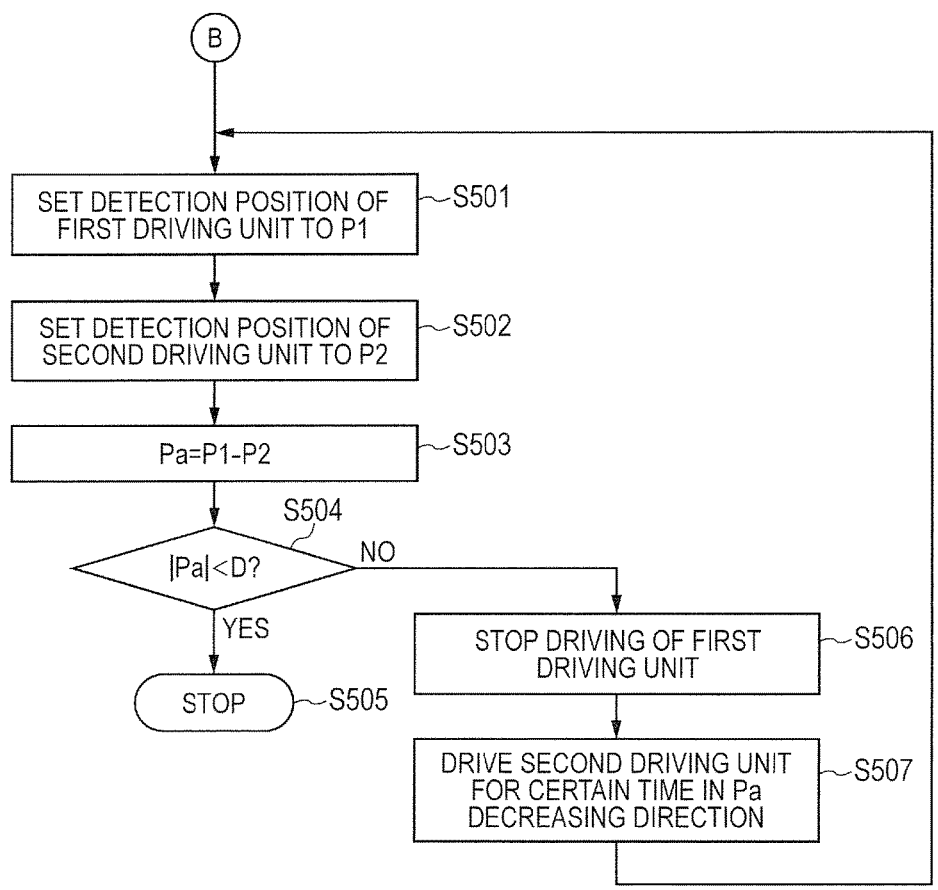
FIG. 5 is a flowchart illustrating a detail of a control flow B (FIG. 4) of inclination correction.

Here if the position P1 of the first driving unit is at the target position, the flow proceeds to step S409, in which or of the first and the second driving unit is stopped, and the flow proceeds to a flow B for executing inclination correction to be described below in FIG. 5. Further, aside from this, in the step S408, if the position. P1 of the first driving unit does not reach the target position, in step S411 a determination is made as to whether or not a difference |P1−P2| between a position P1 and a position P2 exceeds a determined value (predetermined value) P. In this step, the difference |P1−P2| is the value P or less, the flow returns to the step S404 to continue control.

Furthermore, if the difference |P1−P2| exceeds the value P, a determination is made in step S412 as to whether a difference P1−P2 is positive or negative. If the result is zero or less (a negative value), the proceeds to step S413, in which a value of the driving voltage V2 of the second driving unit is reset to a value V2−a that is a value obtained by subtracting a determined voltage a from the present driving voltage V2 of the second unit, and subsequently the flow returns to the step S404 to continue drive. In contrast, in the step S412 if the difference P1−P2 is a positive value, the flow proceeds to step S414, in which a value of the driving voltage V2 of the second driving unit is reset to a value V2+a that is a value obtained by adding a determined voltage a to the present driving voltage V2 of the second unit, and subsequently the flow returns to the step S404.

Although in the above mentioned control, the driving voltage is changed at the side of the second driving unit, the driving voltage may be variably controlled at the side of the first driving unit. Further, in the above mentioned control, in a case where the difference of the driving positions of the first and second driving unit exceeds a prescribed amount, the driving speed may be adjusted by increasing or decreasing the driving voltage of the second driving unit. The first driving unit and the second driving unit are positioned at a predetermined position in such a manner that a difference between driving positions of the first driving unit and the second driving unit does not exceed a prescribed range. In this manner, either of or both of the first driving unit and the second driving unit are driven and controlled to prevent drive from being stopped and an apparatus from being damaged due to increase of drive load resulting from that a difference between driving positions of the two driving unit is made significant. In the embodiment, although the method in which the driving voltage is made variable to change a driving speed of the second driving unit is exemplified, apart from this a driving frequency or a driving phase to be applied to a piezoelectric element may be changed to make the driving speed variable.

Next, while referring to FIG. 5, the flow B for performing inclination correction will be explained. As described above, drive of the first and the second driving unit is stopped in the above-mentioned step S409 in a state where the position P1 of the first driving unit is stopped at the target position, and then when control of the flow B is initiated, in step S501 a position detection result of the first position detection unit is again reset to the position P1.

Next, in step S502 a position detection result of the second position detection unit is set to a position P2, and then the difference P1−P2 between these positions is set to Pa in step S503. Subsequently, in step S504 a determination is made as to whether or not an absolute value of Pa is less than a prescribed value D. Here if the absolute value of Pa is fewer than the prescribed value D, the flow proceeds to step S505 to stop the control. Furthermore, if the absolute value of Pa is the prescribed value D or more, the flow proceeds to step S506. First in the step S506, a power supply to the first driving unit is interrupted to stop drive, and then in step S507 the second driving unit is driven for a certain time in a Pa decreasing direction. And then the flow returns to the step S501 to execute the driving control of the above mentioned inclination correction flow B. While the power supply to one of the first driving unit and the second driving unit is stopped, only the other one of the first driving unit and the second driving unit can be driven and controlled. Accordingly, contrary to the above explanation, first the power supply to the second driving unit is interrupted and subsequently the first driving unit can be driven and controlled.

Due to posture change of the lens driving apparatus 50, fitting backlash may occur between the lens holding member 1 and the first guide bar 3. If the backlash occurs, the lens 2 is caused to be inclined with respect to the optical axis and further the lens holding member 1 is caused to be deformed elastically by its own weight of the lens 2. However, if the lens 2 is inclined with respect to the optical axis, the inclination is corrected to prevent optical performance from deterioration by performing a driving method and implementing a configuration according to the embodiment of the invention explained above.

In this occasion, inclination of the lens 2 is caused in such a manner that backlash of the engaged hole portion 1a engaged with the first guide bar 3 and elastic deformation of the lens holding member 1 by influence of its own weight of the lens 2 are caused to resultantly move the U-shaped groove portion 1b engaged with the second guide bar 4 in the optical axis direction. As a result, the position detection result of the second position detection unit is changed. However, as described above, either of or both of the first driving unit and the second driving unit are driven and controlled to be positioned at a predetermined position in such a manner that the position detection results of the two position detection unit fall within a certain range of values, thereby preventing optical performance from deterioration.

When necessary, the lens driving unit may be arranged near the pair of guide bars 3 and 4 that guide the lens holding member 1 along the optical axis X to change conditions for driving control according to respective positional information thereof.

Although a concrete example has been described in detail as to the lens driving apparatus and the driving method thereof according to the invention as above, the invention is not restricted to the above-mentioned embodiment, and the present invention may be applied to any configuration included within the scope of the appended claims.

In the lens driving apparatus to be used for optical instruments, optical performance is prevented from deterioration due to posture change of the lens driving apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-004693, filed Jan. 14, 2015, which is hereby incorporated by reference herein in its entirety.

What is claimed is:

1. A lens driving apparatus comprising:
   a lens holding member for holding a lens movably in an optical axis direction;

a first guide bar and a second guide bar that support the lens holding member movably in the optical axis direction;

first driving unit and second driving unit that drive the lens holding member in the optical direction, the first driving unit is positioned closer than the second driving unit to the first guide bar, the second driving unit is positioned closer than the first driving unit to the second guide bar in a direction of perpendicular to the optical axis; and first position detection unit and second position detection unit that detect a position of the lens holding member in the optical axis direction, the first position detection unit is positioned closer than the second position detection unit to the first guide bar, the second position detection unit is positioned closer than the first position detection unit to the second guide bar in the direction of perpendicular to the optical axis, wherein upon driving the lens holding member, either of or both of the first driving unit and the second driving unit are driven and controlled from a position detection result of the first position detection unit and the second position detection unit in such a manner that the first driving unit and the second driving unit are positioned at a target position, wherein the first driving unit and the second driving unit drive the same lens.

2. A lens driving apparatus according to claim 1, wherein the lens is held in a position between the first guide bar and the second guide bar in the direction of perpendicular to the optical axis.

3. A lens driving apparatus according to claim 1, wherein the first driving unit and the second driving unit are constituted by a linear type ultrasonic motor.

4. A lens driving apparatus according to claim 1, wherein the first driving unit and the second driving unit are driven at a same driving frequency and a driving voltage for driving the first driving unit and the second driving unit is controlled variably on the basis of a position detection signal of the first position detection unit and the second position detection unit.

5. A lens driving method comprising, upon driving a lens holding member that holds a lens movably in an optical axis direction and that is supported by a first guide bar and a second guide bar, driving and controlling either of or both of a first driving unit and a second driving unit in such a manner that the first driving unit and the second driving unit are positioned at a target position, according to a position detection result of a first position detection unit and a second position detection unit, wherein the first driving unit is positioned closer than the second driving unit to the first guide bar, the second driving unit is positioned closer than the first driving unit to the second guide bar in a direction of perpendicular to the optical axis, wherein the first position detection unit is positioned closer than the second position detection unit to the first guide bar, the second position detection unit is positioned closer than the first position detection unit to the second guide bar in the direction of perpendicular to the optical axis, wherein the first driving unit and the second driving unit drive the same lens.

* * * * *